US011879440B2

(12) United States Patent
Muhamad et al.

(10) Patent No.: US 11,879,440 B2
(45) Date of Patent: Jan. 23, 2024

(54) ROTOR BEARING HOUSING, ROTOR BEARING ARRANGEMENT AND WIND TURBINE

(71) Applicant: Nordex Energy SE & Co. KG, Hamburg (DE)

(72) Inventors: Ibrahim Muhamad, Rostock (DE); Gerald Festner, Klein Krams (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 17/698,728

(22) Filed: Mar. 18, 2022

(65) Prior Publication Data

US 2022/0299014 A1  Sep. 22, 2022

(30) Foreign Application Priority Data

Mar. 18, 2021 (DE) ..................... 10 2021 106 620.4

(51) Int. Cl.
*F03D 80/70* (2016.01)
*F03D 13/20* (2016.01)
*F03D 1/06* (2006.01)

(52) U.S. Cl.
CPC ............... *F03D 80/70* (2016.05); *F03D 1/06* (2013.01); *F03D 13/20* (2016.05); *F03D 80/703* (2023.08); *F05B 2240/50* (2013.01); *F05B 2240/912* (2013.01)

(58) Field of Classification Search
CPC . F03D 80/70; F03D 9/25; F03D 15/00; F93D 15/00; F16C 35/02
See application file for complete search history.

(56) References Cited

U.S. PATENT DOCUMENTS

| 11,428,213 | B2* | 8/2022 | Soerensen | F03D 9/25 |
| 2004/0041407 | A1 | 3/2004 | Pettersen et al. | |
| 2006/0104815 | A1* | 5/2006 | Siegfriedsen | H02K 7/1838 |
| | | | | 416/170 R |
| 2012/0025538 | A1* | 2/2012 | Luneau | F03D 80/70 |
| | | | | 290/55 |
| 2019/0085830 | A1 | 3/2019 | Frydendal et al. | |
| 2019/0186467 | A1 | 6/2019 | Eusterbarkey et al. | |

(Continued)

FOREIGN PATENT DOCUMENTS

DE  10 2007 009 575 A1  8/2008
EP       2 372 150 A1  10/2011

(Continued)

*Primary Examiner* — Justin D Seabe
(74) *Attorney, Agent, or Firm* — Walter Ottesen, P.A.

(57) ABSTRACT

A rotor bearing housing for a wind turbine has: a bearing body for receiving a rotor shaft of the wind turbine, a support body arranged under the bearing body and configured to be coupled at a first end to a base element in order to transmit a force flow between the bearing body and the base element. The base element is arrangeable under the support body for the purposes of rotatable fastening to a first end of a tower of the wind turbine, the bearing body and the support body together forming a single-piece body, and the bearing body and the support body being configured such that, if a geometrical central point of the first receptacle for a rotor bearing is projected onto a cross-sectional plane of the first end of the tower, the geometrical central point is arranged outside a diameter of the tower at the first end.

15 Claims, 9 Drawing Sheets

(56) References Cited

U.S. PATENT DOCUMENTS

2019/0195205 A1* 6/2019 Erikson .................. F03D 80/50
2020/0102939 A1   4/2020 Moeskjaer

FOREIGN PATENT DOCUMENTS

| EP | 2 376 779 B1 | 10/2011 | | |
|---|---|---|---|---|
| EP | 2 740 928 A1 | 6/2014 | | |
| EP | 2 935 881 A1 | 10/2015 | | |
| EP | 3550140 A1 | * | 10/2019 | ............. F03D 13/20 |
| ES | 2 277 795 A1 | 7/2007 | | |
| GB | 2509242 A | 6/2014 | | |
| WO | WO-2016198530 A1 | * | 12/2016 | |

* cited by examiner

A-A

A-A

ROTOR BEARING HOUSING, ROTOR BEARING ARRANGEMENT AND WIND TURBINE

CROSS REFERENCE TO RELATED APPLICATION

This application claims priority of German patent application no. 10 2021 106 620.4, filed Mar. 18, 2021, the entire content of which is incorporated herein by reference.

TECHNICAL FIELD

The disclosure relates to a rotor bearing housing for a wind turbine, to a rotor bearing arrangement and to a wind turbine having such a rotor bearing housing.

BACKGROUND

A wind turbine has a rotor via which wind energy can be converted into a drive torque which, via a drivetrain, can drive a generator. The drivetrain, the generator and other components may be installed in a nacelle that is positioned on a tower.

SUMMARY

It is sought to specify a rotor bearing housing for a wind turbine which allows reliable support of a rotor and of the associated rotor shaft. It is furthermore sought to specify a rotor bearing arrangement for a wind turbine which allows reliable support of a rotor and of the associated rotor shaft. It is furthermore sought to specify a wind turbine which allows reliable operation.

In one embodiment, a rotor bearing housing for a wind turbine has the following:
- a bearing body for receiving a rotor shaft, which rotates about an axis of rotation, of the wind turbine, the bearing body having a first receptacle at a first end for a first rotor bearing and having a second receptacle for a second rotor bearing at a second end that is situated oppositely along an axial direction, the bearing body extending longitudinally along the axial direction,
- a support body, which is arranged under the bearing body and which is configured to be coupled at a first end to a base element in order to transmit a force flow between the bearing body and the base element, the base element being arrangeable under the support body for the purposes of rotatable fastening to a first end of a tower of the wind turbine,
- the bearing body and the support body together forming a single-piece body, and
- the bearing body and the support body being configured such that, if a geometrical central point of the first receptacle is projected onto a cross-sectional plane of the first end of the tower, the geometrical central point is arranged outside a diameter of the tower at the first end.

The rotor bearing housing is made in particular of a single-piece body, which may be produced for example by a casting process. For example, the casting is produced using a sand molding process. For example, the rotor bearing housing has spheroidal graphite cast iron or is formed from spheroidal graphite cast iron. Irrespective of the material and production method, the single-piece form allows good dimensional stability and a good stiffness distribution within the rotor bearing housing. A force flow within the rotor bearing housing can be dissipated efficiently into the tower during operation. It is possible to eliminate connections that have to be produced retroactively between the individual elements, for example between the bearing body and the support body. Corresponding tolerances of such connections therefore do not need to be allowed for. A time saving is possible owing to the assembly steps that are not required. The single-piece rotor bearing housing is relatively easy to transport. Furthermore, a space-saving configuration can be realized, such that even drivetrains with rolling bearings of large diameters can be implemented within predefined installation spaces.

The projection of the first receptacle onto the cross-sectional plane of the first end of the tower is arranged outside the diameter of the tower in the operational state. A projection of the first receptacle is to be understood in particular to mean the projection of the geometrical central point of the first receptacle. This means that the geometrical central point of the first receptacle is arranged outside the circumference of the tower head as seen in a plan view. The geometrical central point of the first receptacle is for example arranged outside the diameter of the tower connection in the operational state. The geometrical central point of the first receptacle is for example arranged outside the tower head diameter in the operational state. The geometrical central point of the first receptacle is for example arranged outside a rotary yaw connection in the operational state. For example, the geometrical central point of the first receptacle is arranged outside the tower outer diameter, in particular outside the tower wall. For example, the geometrical central point of the first receptacle is arranged outside the tower inner diameter.

The arrangement of the first receptacle for the first rotor bearing allows a beneficial force flow. The forces and torques from the drivetrain, for example from the rotor and the rotor shaft, are transmitted via the rotor bearing housing into the tower on an ideal path. In particular, an acute angle in the transmission of the force flow is avoided. Furthermore, a sufficient spacing between the rotor blades and the tower is ensured. The sealing and lubrication systems that are provided at the first receptacle are easily accessible, for example for the purposes of installation and/or maintenance.

According to at least one further embodiment, the support body has a circular symmetrical shape at a first end that is connectable to the base element. The support body has an elliptical outline in cross sections that are above the first end and parallel to the base element. For example, the support body has an elliptical outline in every cross section that is above the first end, outside the first end and parallel to the base element. The support body is for example of circular ring shape directly at the base element, similarly to a yaw bearing. The cross sections of the support body parallel to the base element, or horizontally spaced apart from the base element, have an ellipse shape, or are of elliptical ring shape.

The combination of the circular symmetrical shape at the base element and of the elliptical outline at the rest of the support body allows an efficient transmission of force, and a small installation space requirement. The circular symmetrical shape at the first end of the support body allows a good transmission of force into the yaw bearing and a good stiffness distribution of the support body in relation to an inner ring and/or outer ring of the yaw bearing. The elliptical basic shape of the rest of the support body allows a good force flow between the bearing body and the base element. Furthermore, the elliptical basic shape allows a greater support width for the support of the bearing body than a corresponding circular basic shape at the second end of the support body. To achieve the same support width at the second end by way of a circular basic shape as with the ellipse shape, the circle would have to have a larger diameter. In relation to this, the elliptical basic shape allows a saving of material and installation space, and therefore requires less space in the nacelle.

According to at least one further embodiment, the support body has a connecting wall. The connecting wall extends between the first and the second end of the support body. The connecting wall has, at the first receptacle, a first angle with respect to a main extent plane of the base element. The connecting wall has, at the second receptacle, a second angle with respect to the main extent plane. The two angles differ from one another. It is thus possible, for example, for the first receptacle to be positioned, in the projection, outside the base element and sufficiently far from the base element. Here, at the second receptacle, a different angle of the support body may be realized, which is for example adapted to the force flow at the second receptacle.

According to at least one further embodiment, the support body has a wall thickness which varies between the base element and the bearing body. The wall thickness is for example configured to be non-uniform. For example, it is thus possible for the wall thickness to be adapted to force flows that occur during operation, such that reliable support is realized with simultaneously relatively low outlay on material.

According to at least one further embodiment, the support body is, at the first receptacle, oriented so as to be inclined in a first direction between the first end of the support body and the bearing body. The support body is likewise, at the second receptacle, oriented so as to be inclined in the first direction. For example, the support body is thus oriented so as to be inclined in one direction proceeding from the base element, in particular in the direction from which the wind flow is incident during operation. This allows the projection of the geometrical central point of the first receptacle to be arranged sufficiently far outside the tower. Other orientations of the support body are also possible, and it is in particular also possible for the support body to be oriented so as to be inclined in a different direction at the first receptacle than at the second receptacle.

According to at least one embodiment, the geometrical central point of the first receptacle and a geometrical central point of the second receptacle have a spacing to one another along a transverse direction. The spacing of the two geometrical central points with respect to one another is at least as great as a diameter of the tower at the first end of the tower. The transverse direction is offset with respect to the axial direction by a predetermined inclination angle and runs transversely with respect to the longitudinal direction of the tower.

According to at least one further embodiment, the geometrical central point of the first receptacle has a greater spacing to the cross-sectional plane of the first end of the tower than the geometrical central point of the second receptacle. The bearing body is thus in an altogether inclined arrangement during operation, such that the rotor blades can be arranged further remote from the tower.

According to at least one further embodiment, the projection of the geometrical central point of the first receptacle and a projection of the geometrical central point of the second receptacle onto the cross-sectional plane are each arranged outside the diameter of the tower at the first end. The extent of the bearing body is for example longer than the diameter of the tower. Reliable support of the rotor shaft is thus made possible, and a good transmission of force into the tower can still be realized. According to further embodiments, the projection of the second receptacle onto the cross-sectional plane of the first end of the tower is arranged within the diameter of the tower, such that structural space can be saved.

According to at least one further embodiment, the support body has an access opening. The access opening is arranged between the bearing body and the support body. The access opening is thus arranged spaced apart from the first end of the support body. This allows a stable configuration of the support body at the first end, without interruptions. The access opening is arranged at a position at which the forces that have to be accommodated are lower than those at the first end of the support body.

According to at least one further embodiment, the first receptacle and the second receptacle are directly supported by the support body. The bearing body is supported by the support body partially or entirely via the first receptacle and the second receptacle. The support body is in particular situated, along the longitudinal direction, in each case directly under the first and second receptacles. It is thus possible to increase the stiffness of the supporting structure around the respective rotor bearings. This allows a more favorable load distribution of the rolling bodies on the raceway thereof.

According to at least one further embodiment, the bearing body is open at least in certain regions, in particular at its underside. The bearing body and the support body transition into one another and merge in a flowing manner. The access opening can thus be made large. It is thus made easier for maintenance personnel to enter the nacelle. It is thus possible, for example, for health and safety guidelines to be reliably complied with. The open bearing body allows easy access to the rotor bearings, for example for maintenance work such as an exchange of seals.

According to at least one embodiment, a rotor bearing arrangement has a rotor bearing housing as described here. The rotor bearing arrangement has a first rotor bearing, which is arranged in the first receptacle. The rotor bearing arrangement has a second rotor bearing, which is arranged in the second receptacle. The first rotor bearing and the second rotor bearing each serve for the mounting of the rotor shaft. The first rotor bearing and the second rotor bearing are each rolling bearings, in particular tapered-roller bearings or angular-contact ball bearings. Rolling bearings, in particular tapered-roller bearings and angular-contact ball bearings, accommodate both radial forces and axial forces. The first rotor bearing and the second rotor bearing are in particular arranged mirror-symmetrically, and are braced in an O or X arrangement with respect to one another. The first rotor bearing and the second rotor bearing may have the same or different dimensions.

In one embodiment, a wind turbine has a tower, a nacelle and a rotor with a rotor shaft. The wind turbine has a rotor bearing housing according to at least one of the embodiments described here. The rotor bearing housing is arranged in the nacelle. The rotor bearing housing is fastened rotatably to the tower at a first end of the tower. The rotor shaft extends through the bearing body. The first receptacle faces toward the rotor. The second receptacle faces away from the rotor. The receptacle facing toward the rotor is, in a projection, arranged outside the tower. This allows an efficient force flow for the support of the rotor shaft within the rotor bearing housing and for the transmission of forces and moments into the tower.

The described advantages and refinements of the rotor bearing housing also apply to the wind turbine and vice versa.

According to at least one further embodiment, the first rotor bearing is arranged in the first receptacle. If a geometrical central point of the first rotor bearing is projected onto a cross-sectional plane of the first end of the tower, the geometrical central point of the first rotor bearing is arranged outside the tower at the first end of the tower. The rotor bearing housing is thus dimensioned such that the first rotor bearing is arranged in front of the tower at the first end of the tower. This allows a large span for the transmission of loads to the tower.

According to at least one further embodiment, the first rotor bearing faces toward an incident wind flow during operation. During operation, a wind flow is incident on the rotor from a side that faces away from the first rotor bearing. The first rotor bearing is arranged upstream of the tower in relation to the incident wind flow.

According to at least one embodiment, the bearing body surrounds the rotor shaft. The rotor bearing housing completely surrounds the rotor shaft along the circumference of the rotor shaft in the region of the rotor bearing housing. The rotor shaft may protrude out of the bearing body along the axial direction in the direction of the rotor and in the opposite direction. At the first receptacle and at the second receptacle, in each case one receptacle is provided in order to receive in each case one first and one second rotor bearing respectively, the rotor bearings being provided for the mounting of the rotor shaft. Between the first receptacle and the second receptacle, the bearing body completely surrounds the rotor shaft in a radial direction. In particular, between the first receptacle and the second receptacle, the rotor bearing housing completely surrounds the rotor shaft in a radial direction.

According to at least one embodiment, the second rotor bearing is arranged in the second receptacle. The rotor bearing housing is configured such that a spacing between the geometrical central point of the first rotor bearing and the geometrical central point of the second rotor bearing is greater than a diameter of the tower at the first end of the tower. The rotor bearing housing with the support body and the arrangement of the first rotor bearing outside the tower at the first end of the tower allows the greater spacing between the first rotor bearing and the second rotor bearing in relation to the diameter of the tower at the first end of the tower. This allows a large support width for the support of the bearing body irrespective of the diameter of the tower at the first end of the tower.

According to at least one embodiment, the wind turbine has the base element. The base element is assigned a yaw system, which is provided for the rotatable fastening of the rotor bearing housing to the first end of the tower. The base element is coupled, for example screwed, to the support body at the first end of the support body.

The wind turbine with the rotor bearing housing described here makes it possible for the rotor bearings to be pre-installed and pre-adjusted before the rotor bearing housing is installed in the nacelle. In the event of damage, or for the purposes of maintenance, the rotor bearings can be removed from the rotor bearing housing, and for this purpose it is not necessary for the nacelle to be completely removed or for the drivetrain to be completely dismantled into individual parts. Altogether, the rotor bearing housing makes it possible for the wind turbine to be divided up into modules with acceptable transport masses. The wind turbine can be realized with large rolling bearing diameters even in a predefined installation space in the nacelle.

Further advantages, features and refinements will emerge from the following embodiments, which will be discussed in conjunction with the figures. Elements which are the same, are of the same type or have the same action may be denoted by the same reference designations.

BRIEF DESCRIPTION OF THE DRAWINGS

The invention will now be described with reference to the drawings wherein.

DESCRIPTION OF THE PREFERRED EMBODIMENTS

Figure 1:
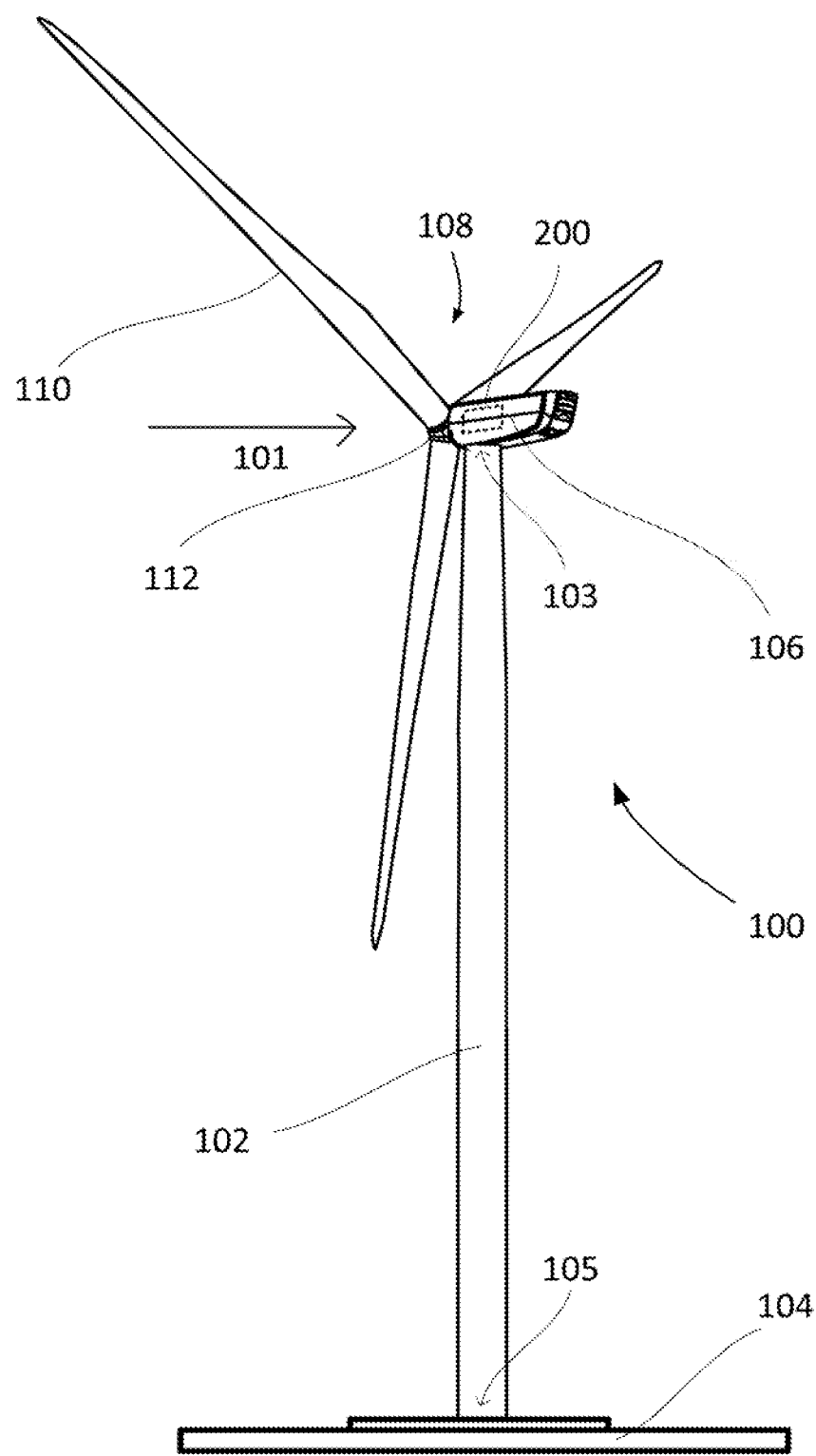
FIG. 1 is a schematic illustration of a wind turbine according to an embodiment.

FIG. 1 is a schematic illustration of a wind turbine 100 according to an embodiment. The wind turbine 100 has a tower 102. The tower 102 is, at a second end 105 of the tower 102, fastened to an underlying ground surface via a foundation 104. A nacelle 106 is mounted rotatably on a first end 103, situated opposite the underlying ground surface, of the tower 102. The nacelle 106 has, for example, a generator that is coupled via a drivetrain to a rotor 108. The drivetrain has, for example, a rotor shaft 109 (FIG. 9), a transmission, a clutch, a rotor brake and other components. The rotor 108 has, for example, one or more rotor blades 110, which are arranged on a rotor hub 112. The rotor hub 112 is in turn connected to the rotor shaft 109. In the nacelle 106, the rotor shaft 109 is mounted rotatably in a rotor bearing housing 200. An incident wind flow 101 is incident on the wind turbine 100 from the direction of the rotor 108, such that the wind arrives firstly at the rotor 108 and then at the tower 102. The wind turbine 100 is thus in particular a so-called windward-rotor-type wind turbine.

Figure 2:
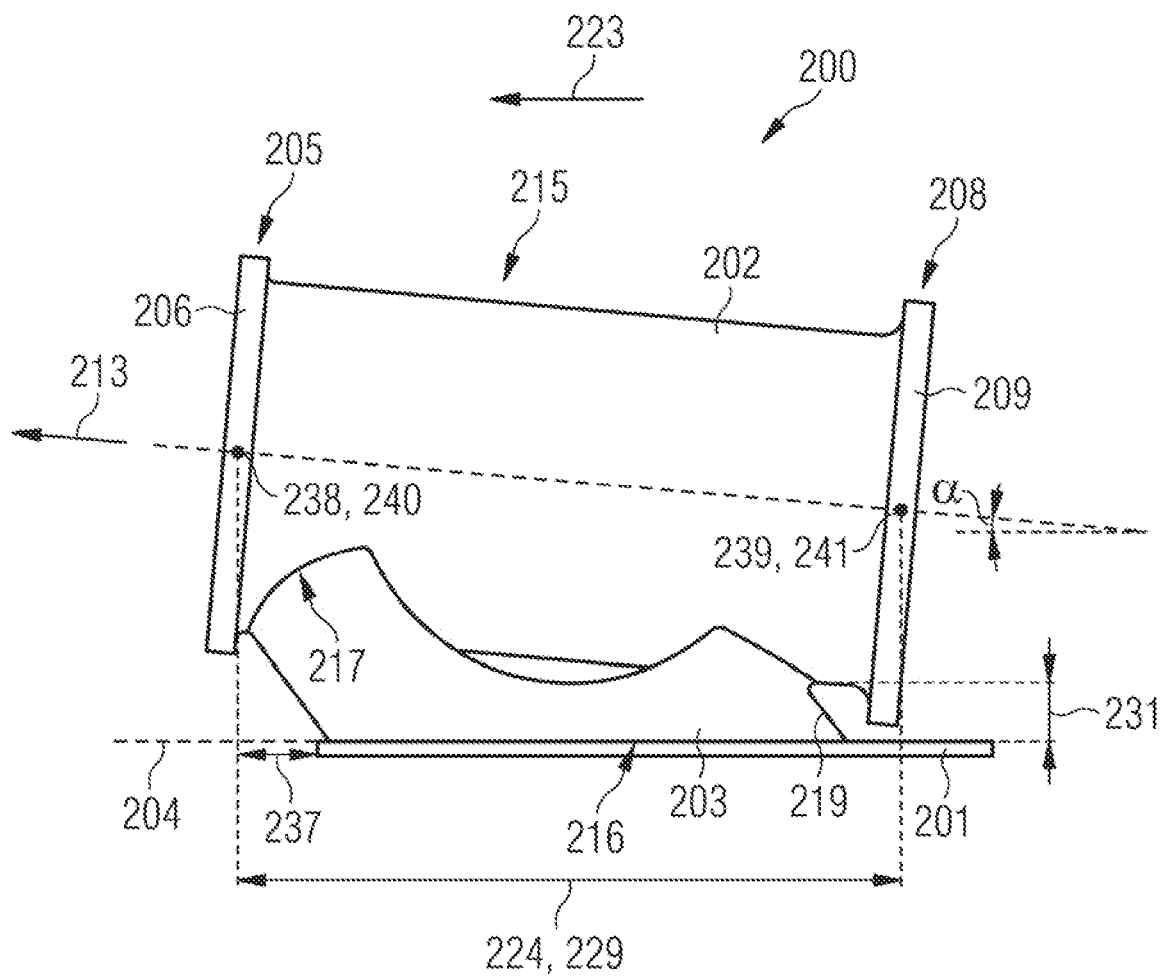
FIG. 2 is a schematic illustration of a rotor bearing housing according to an embodiment.

FIG. 2 shows the rotor bearing housing 200 according to an embodiment. The rotor bearing housing 200 is fastened to a base element 201 for example via a screw connection. The rotor bearing housing 200 is formed as a single piece from a single body 215. In particular, the rotor bearing housing 200 is not made of multiple interconnected constituent parts, but is formed as a single housing body, without screw connections or the like. In particular, the entire rotor bearing housing 200 is produced as one coherent component by way of a single casting process.

Figure 9:
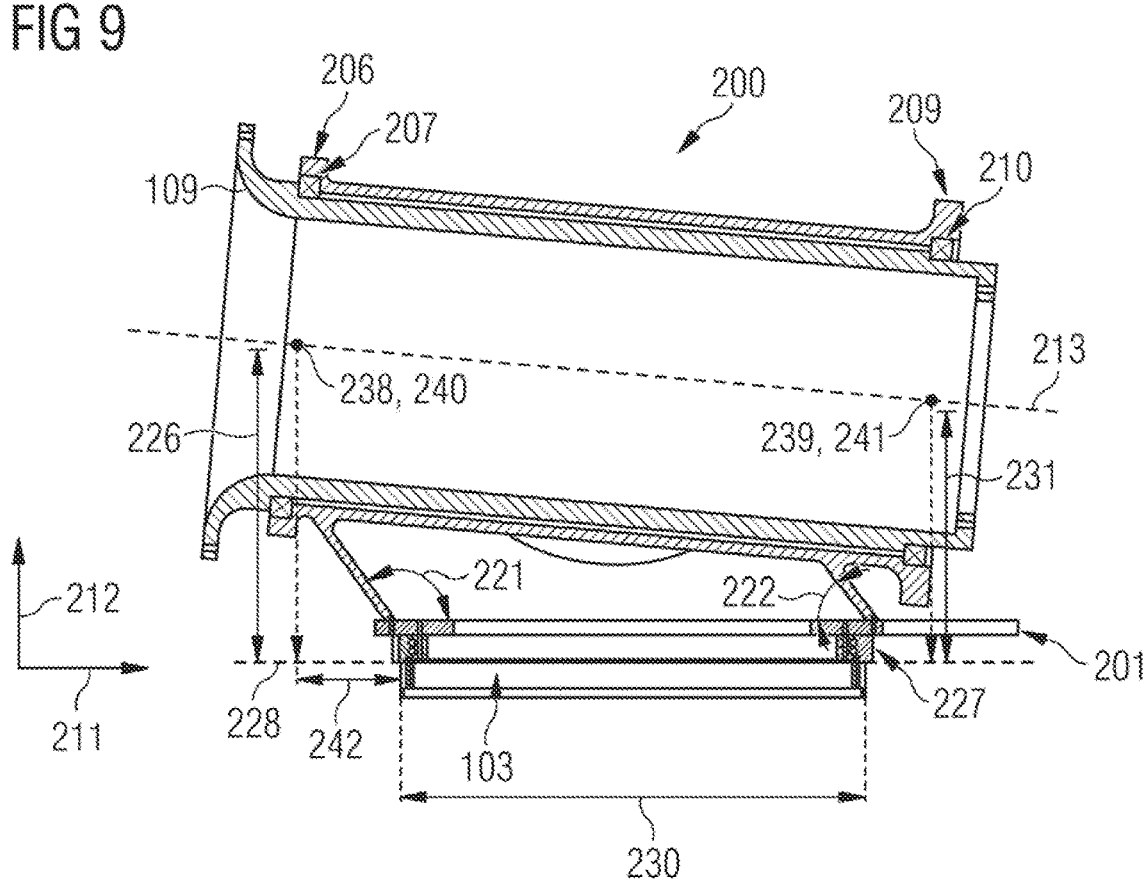
FIG. 9 is a schematic illustration of a part of a wind turbine according to an embodiment.

During operation, the base element, to which the rotor bearing housing 200 is fixed, faces toward the tower 102 along a longitudinal direction 212, which corresponds in particular to a main extent direction of the tower 102. The base element 201 belongs to a yaw system, which allows a rotatable coupling of the rotor bearing housing 200 to the tower 102 (FIG. 9).

Along the longitudinal direction 212, on a side of the base element 201 which is averted from the tower 102, there is provided a support body 203 which is a constituent part of the rotor bearing housing 200. The support body 203 extends along the longitudinal direction 212 between a first end 216 and a second end 217 of the support body 203. The first end 216 of the support body 203 adjoins the base element 201.

The second end 217 of the support body 203 adjoins a bearing body 202, which is also a constituent part of the rotor bearing housing 200. The bearing body 202 serves for the support and rotatable mounting of the rotor shaft 109. The bearing body 202 is supported by the support body 203. Along the longitudinal direction 212, the support body 203 is arranged between the base element 201 and the bearing body 202. For example, at a side facing toward the rotor, there is provided a rotor arresting device 250 (FIGS. 13 and 15) which is for example fastened to the rotor bearing housing 200 or formed integrally in the rotor bearing housing 200. The rotor 108 can be arrested via the rotor arresting device 250. It is thus possible for a rotation of the rotor 108 to be blocked, for example during maintenance.

The bearing body 202 extends for example in the manner of a hollow cylinder or hollow frustum along an axial direction 213 that is defined by the axis of rotation 213 of the rotor shaft 109. The axial direction 213 is offset with respect to a transverse direction 211 by an inclination angle α. The inclination angle α normally lies between 2° and 8°. Other angle values are however conceivable. The transverse direction 211 runs transversely with respect to the longitudinal direction 212 and in particular transversely with respect to the longitudinal direction of the tower 102.

A first receptacle 206 for a first rotor bearing 207 (FIG. 9) is formed at a first end 205 of the bearing body 202. During operation, the first end 205 of the bearing body 202 faces toward the rotor 108. Facing away from the first end 205 along the axial direction 213, the bearing body 202 has a second end 208. A second receptacle 209 for a second rotor bearing 210 (FIG. 9) is formed at the second end 208 of the bearing body 202. In the operational state, the first rotor bearing 207 and the second rotor bearing 210 are arranged in the rotor bearing housing 200 in order to form a rotatable connection between the rotor bearing housing 200 and the rotor shaft 109.

In the operational state, the rotor shaft 109 is rotatable about the axis of rotation 213 (FIG. 9) relative to the rotor bearing housing 200.

The base element 201 has a main extent plane 204. The base element 201 has its greatest extent in the main extent plane 204. The base element 201 has a greater extent along the main extent plane 204 than transversely with respect to the main extent plane 204. The base element 201 may for example be configured in the form of a ring, a plate or a disk. For example, the base element 201 is configured as described in DE 10 2007 009 575 B4, for example as in paragraph 14 of the document.

In a projection onto the main extent plane 204, which is for example oriented in the same direction as the cross-sectional plane 228, the first receptacle 206 is in particular arranged outside or in front of the base element 201. The support body 203 has a protruding region 237, which protrudes beyond the base element 201 along the transverse direction 211. It is thus achieved that the first receptacle 206 and thus the first rotor bearing 207 are arranged in front of the cross section of the tower 102 along the transverse direction 211 at the first end 103 of the tower 102. According to embodiments, in a projection onto the main extent plane 204, the second receptacle 209 is likewise arranged outside the cross section of the tower 102 at the first end 103 of the tower 102. According to further embodiments, in a projection onto a cross-sectional plane 228 (FIG. 9) of the tower 102 at the first end 103 of the tower 102, the second receptacle 209 is arranged within the tower cross section. In particular, in a projection onto the cross-sectional plane 228 of the tower 102 at the first end 103 of the tower 102, at least a geometrical central point 238 (FIG. 3) of the first receptacle 206 is arranged outside the tower cross section.

A geometrical central point 238, 239, 240, 241 refers in particular to that point which corresponds to an average of all points within the receptacle 206, 209 or the rotor bearing 207, 210. For example, the inner wall of the receptacle 206, 209 or of the rotor bearing 207, 210 has substantially the same spacing to the geometrical central point 238, 239, 240, 241 at all points along the ring shape of the inner wall. The circular shape of the receptacle 206, 209 or of the rotor bearing 207, 210 is formed in the case of a constant radius about the geometrical central point 238, 239, 240, 241. The bearing body 202 is arranged so as to be inclined in relation to the longitudinal direction 212. In particular, the bearing body 202 is inclined in relation to the base element 201. The geometrical central point 238 of the first receptacle 206 has a first spacing 226 between the geometrical central point 238 and the cross-sectional plane 228 (FIG. 9). The first spacing 226 at the first receptacle 206 is greater than a second spacing 231 between the geometrical central point 239 of the second receptacle 209 and the cross-sectional plane 228.

The bearing body 202 is configured such that a spacing 224 is formed between the first receptacle 206 and the second receptacle 209 along the transverse direction 211. The bearing body 202 is in particular configured such that the spacing 224 is formed between the two geometrical central points 238, 239 along the transverse direction 211. The spacing 224 is greater than a diameter of the first end 103 of the tower 102 along the transverse direction 211. In particular, the spacing 224 is greater than the diameter 230 of the first end 103 of the tower 102, irrespective of whether the second receptacle 209, in a projection onto the main extent plane 204, is arranged within or outside the first end 103 of the tower 102. The first receptacle 209 is arranged at a corresponding distance in front of the first end 103 of the tower 102, or the protruding region 242 protrudes sufficiently far beyond the tower 102 at the first end 103, such that the spacing 224 is always greater than the diameter 230 of the first end 103 of the tower 102. For example, a minimum spacing between the geometrical central point 238 and the tower diameter 230 is at least 3 cm, at least 10 cm or at least 50 cm. For example, a minimum spacing between the geometrical central point 238 and the tower diameter 230 is at least equal to one quarter of the rolling body length, at least equal to half of the rolling body length, at least equal to the rolling body length, or greater than the rolling body length.

Figure 3:
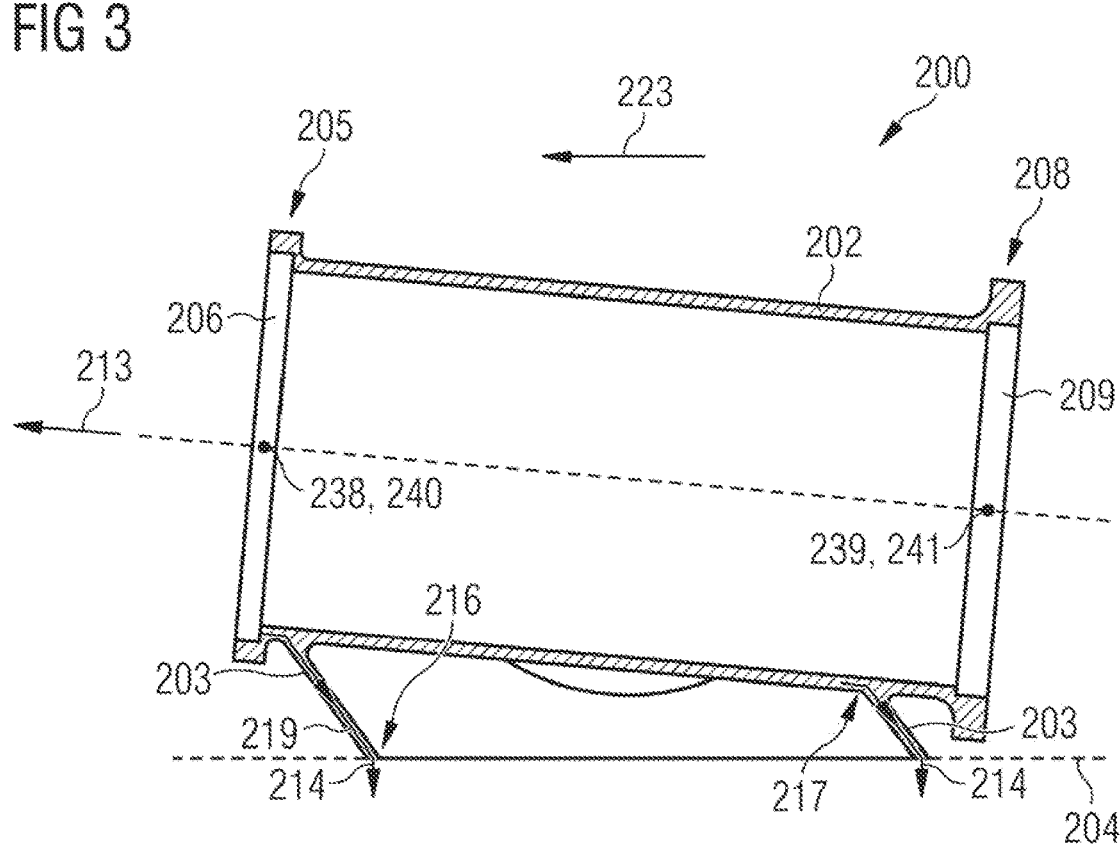
FIGS. 3 and 4 are schematic illustrations of a rotor bearing housing according to an embodiment.
Figure 4:
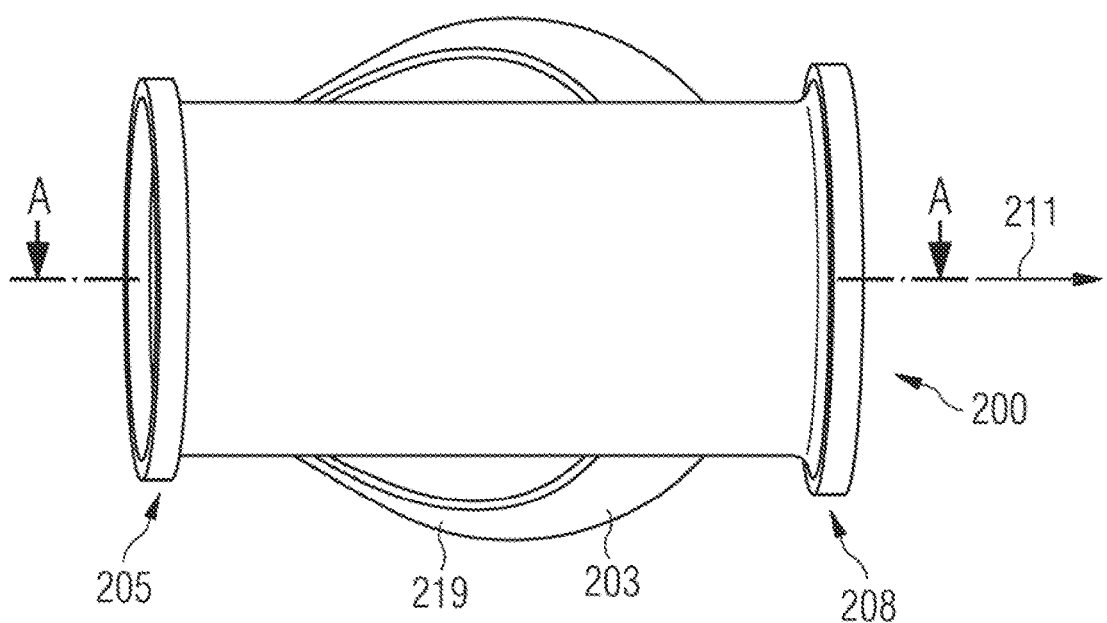
Figure 5:
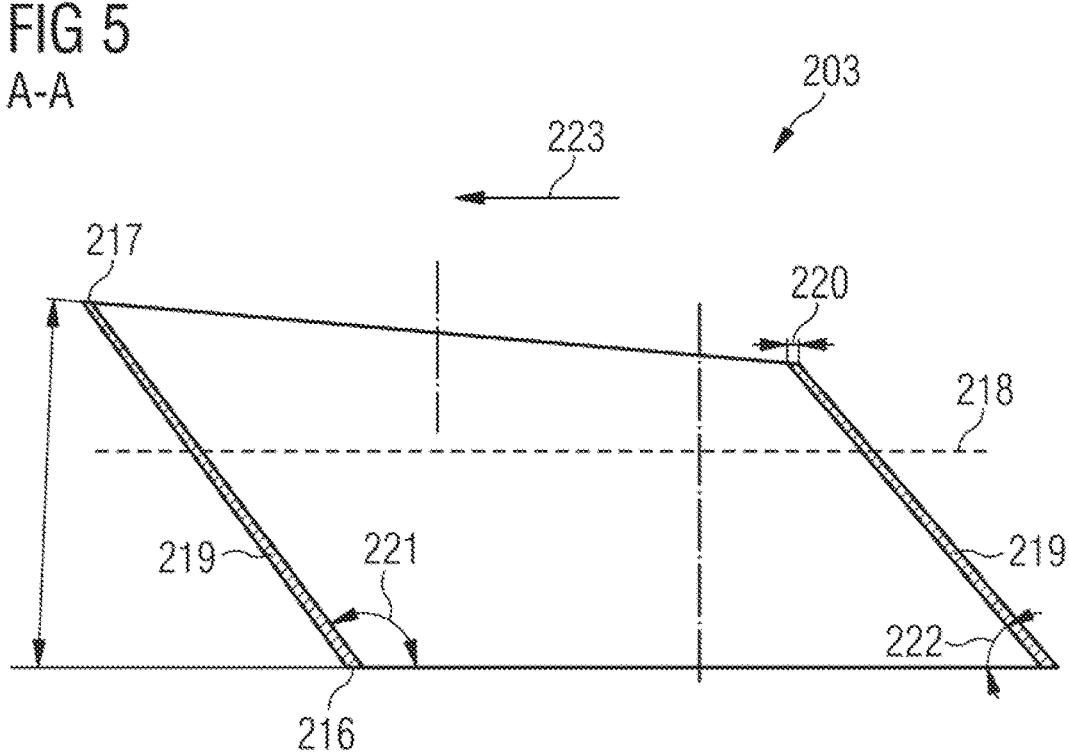
FIGS. 5 to 8 are schematic illustrations of support bodies according to various embodiments.

FIGS. 3 and 4 show the rotor bearing housing 200 in further views.

As can also be seen from the sectional view in FIG. 3, the support body 203 has a connecting wall 219, which surrounds a cavity and which connects the bearing body 202 to the base element 201. During operation, a force flow 214 is transmitted from the rotor bearings 207, 210 into the bearing body 202. The force flow 214 is then distributed over the circumference of the support body 203 and is transmitted onward to the base element 201. From the base element 201, the force flow 214 can be dissipated into the tower 102.

For example, the support body 203 is inclined in a first direction 223. In particular, the first direction 223 is opposite to the direction of the incident wind flow 101 during operation. Proceeding from the base element 201, the support body 203 is inclined in the direction of the rotor 108. This allows the projection of the first rotor bearing 207 to be arranged sufficiently far outside and in front of the tower 102 at the first end 103.

The base element 201 surrounds the support body 203 in particular over a full circumference. The contour of the base element 201 may for example have a circular shape or other shapes (as in FIG. 10).

The inclination and configuration of the connecting wall 219, or the overall shape of the support body 203, may be implemented differently in different embodiments, as can be seen for example from FIGS. 5 to 8. In particular, it is possible for the connecting wall 219 to be inclined in the same direction at the first receptacle 206 and at the second receptacle 209. It is also possible for the connecting wall 219 to be inclined in an opposite direction at the first receptacle 206 than at the second receptacle 209. In embodiments, the connecting wall 219 is inclined in the first direction 223. According to further embodiments, the connecting wall 219 is, at least in certain sections, inclined counter to the first direction 223.

Figure 6:
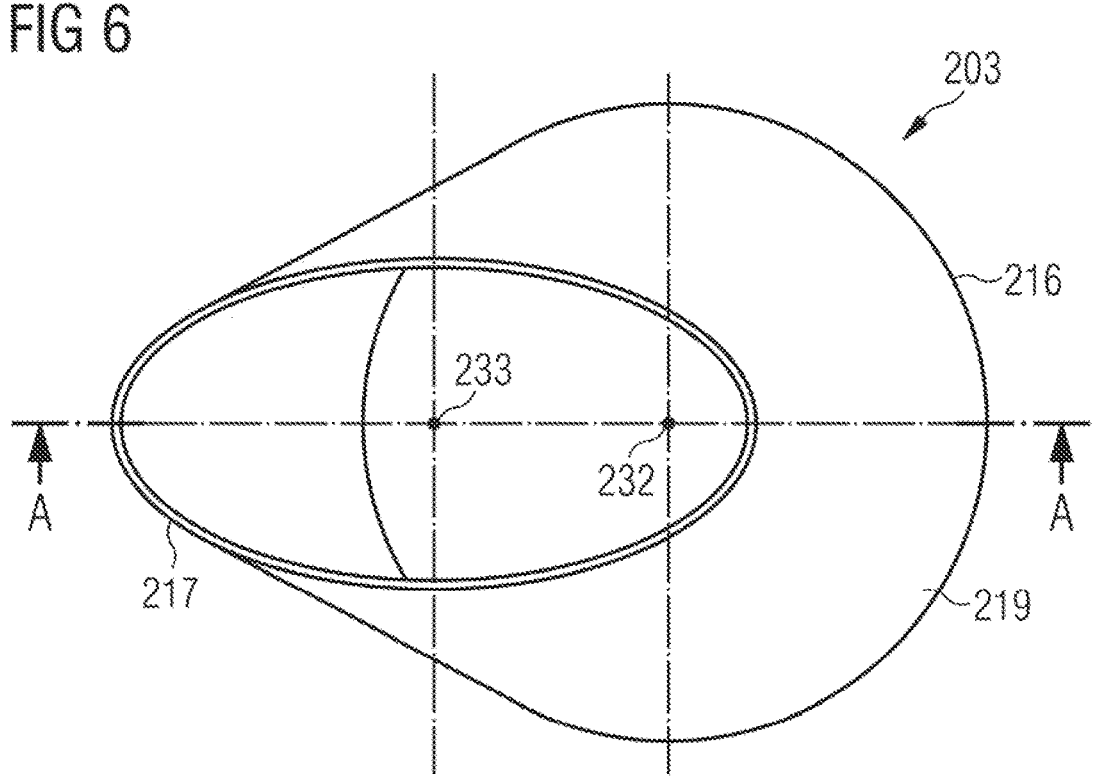
Figure 7:
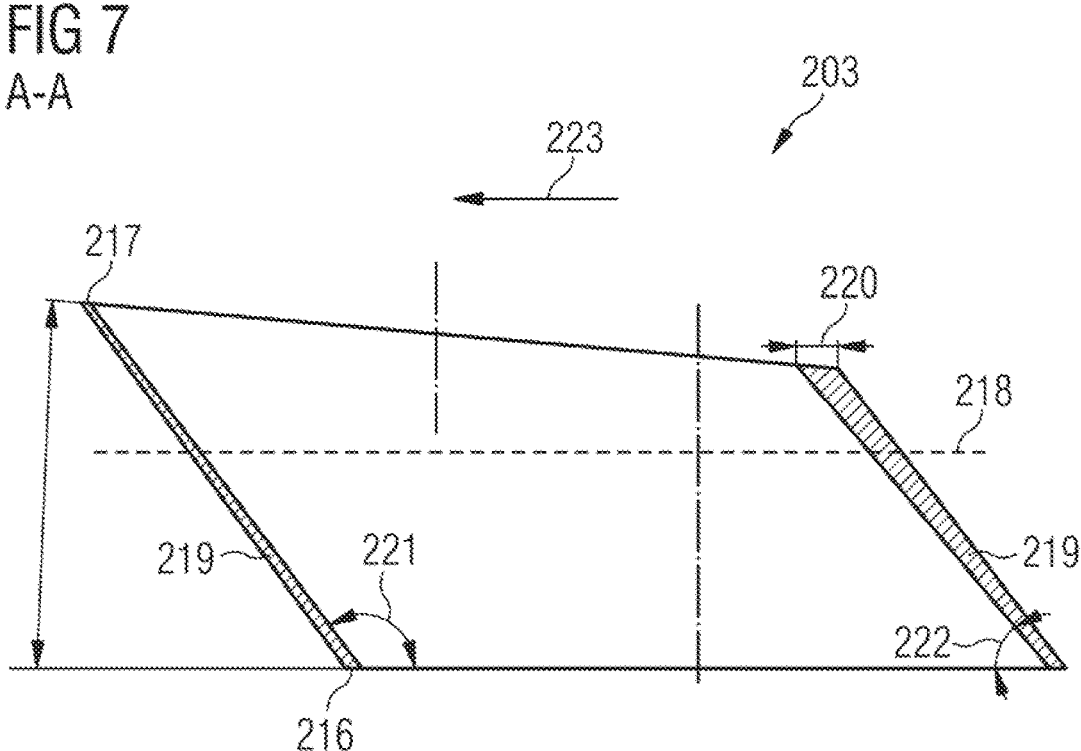
Figure 8:
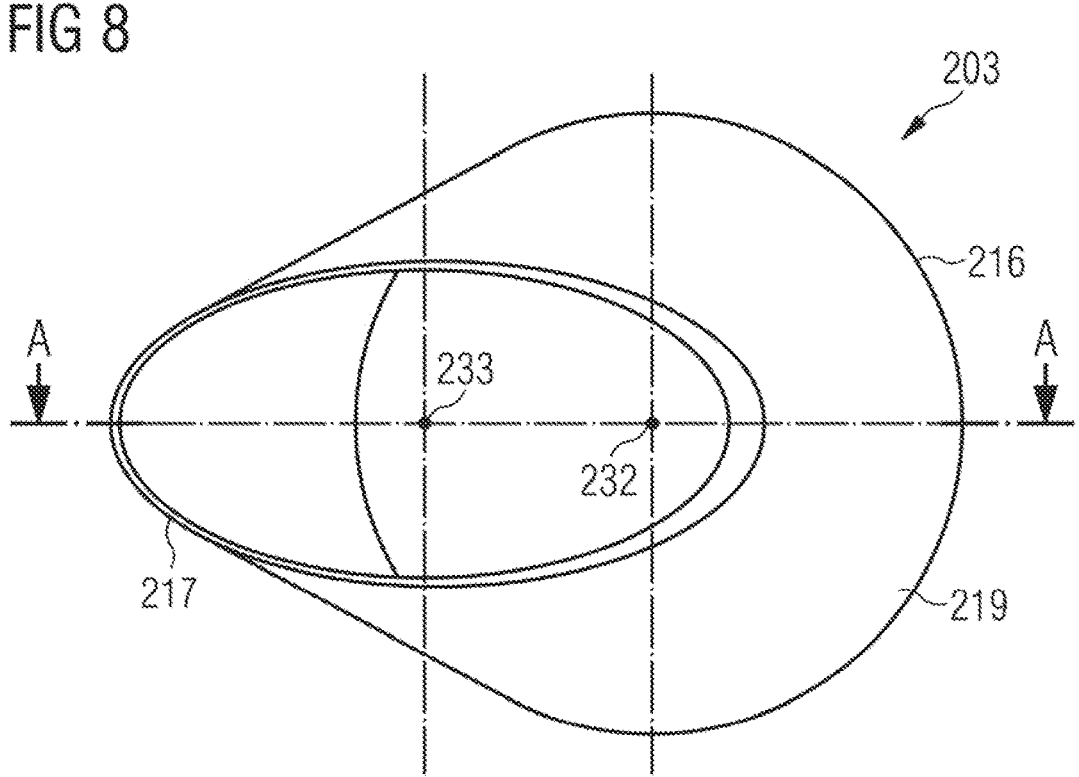

The various embodiments have in common the fact that the support body 203 has a circular outline at the first end 216, facing toward the base element 201, of the support body 203, as can be seen for example from FIGS. 6 and 8. At a distance from the first end 216, the support body 203 has a shape that deviates from a circular shape. A cross section 218 along the transverse direction 211 and transversely with respect to the longitudinal direction 212 of the support body 203 has, for example, an elliptical shape, as can likewise be seen for example from FIGS. 6 and 8. This applies to every cross section that is situated above the first end 216. The connecting wall 219 thus has a transition from the circular shape at the first end 216 to an elliptical outline.

A central point 232 of the circular shape at the first end 216 of the support body 203 is in particular different from a central point 233 of the elliptical shape of the support body 203 at a distance from the first end 216. For example, the central points 232, 233 are offset with respect to one another along the first direction 223. For example, the inclination of the support body 203 in the first direction 223 is thus realized.

At the first receptacle 206, the connecting wall 219 has a first angle 221 with respect to the main extent plane 204 or with respect to an inner side of the base element 201. The first angle 221 is in particular within the support body 203. At the second receptacle 209, a second angle 222 is formed between the connecting wall 219 and the main extent plane 204 or an inner side of the base element 201. The second angle 222 is likewise formed within the support body 203.

The first angle 221 and the second angle 222 are for example different than one another. It is also possible for the first angle 221 and the second angle 222 to be equal. According to embodiments, the first angle 221 is an acute angle, a right angle or an obtuse angle. According to embodiments, the second angle 222 is an acute angle, a right angle or an obtuse angle. For example, the first angle 221 is between 60 and 140°. The second angle 222 is for example between 60 and 140°. Other angle values for the first angle 221 and the second angle 222 are also possible.

The connecting wall 219 has a wall thickness 220, which is measured in particular along the transverse direction 211. The wall thickness 220 is for example constant, without variation, between the base element 201 and the bearing body 202, as illustrated for example in FIG. 5. According to further embodiments, the wall thickness 220 varies between the base element 201 and the bearing body 202, as illustrated for example in FIGS. 7 and 8. In particular, the wall thickness 220 is greater at the bearing body 202 than at the base element 201. This allows a good force flow 214 and reliable accommodation of forces and moments from the bearing body 202 via the support body 203.

FIG. 9 shows the rotor bearing housing 200 in the operational state according to an embodiment. The rotor shaft 109 is arranged within the bearing body 202. The first rotor bearing 207 and the second rotor bearing 210 are provided between the rotor shaft 109 and the bearing body 202 in order to allow the rotation of the rotor shaft 109 relative to the bearing body 202. The first rotor bearing 207 faces toward the rotor hub 112. The second rotor bearing 210 faces away from the rotor hub 112 along the transverse direction 211.

The rotor bearing housing 200 is fastened to the base element 201 of a yaw system. The yaw system includes, inter alia, the base element 201, a yaw bearing 227 and yaw drives (not illustrated), which are installed on the base element 201. The yaw system allows a rotation of the rotor bearing housing 200 and of the nacelle 106 about the tower 102.

Via the yaw system, the rotor bearing housing 200 is fastened rotatably to the first end 103 of the tower 102, in particular to a so-called tower connection.

At its first end 103, the tower 102 has a diameter 230. A spacing 229 between the rotor bearings 207, 210 is greater than the diameter 230. The spacing 229 between the geometrical central points 240, 241 of the rotor bearings 207, 210 is greater than the diameter 230. The spacing 229 between the rotor bearings 207, 210 is in particular the spacing between the geometrical central points 240, 241 of the two rotor bearings 207, 210 along the transverse direction 211 (FIG. 2). The geometrical central point 240 of the first rotor bearing 207 is, in projection onto a cross-sectional plane 228 of the first end 103 of the tower 102, arranged outside the tower 102, in particular in front of the tower 102 along the transverse direction 211. Correspondingly, the first receptacle 206 is, at least at that side of the bearing body 202 which faces toward the tower 102, arranged outside the tower cross section in the cross-sectional plane 228.

Figure 10:
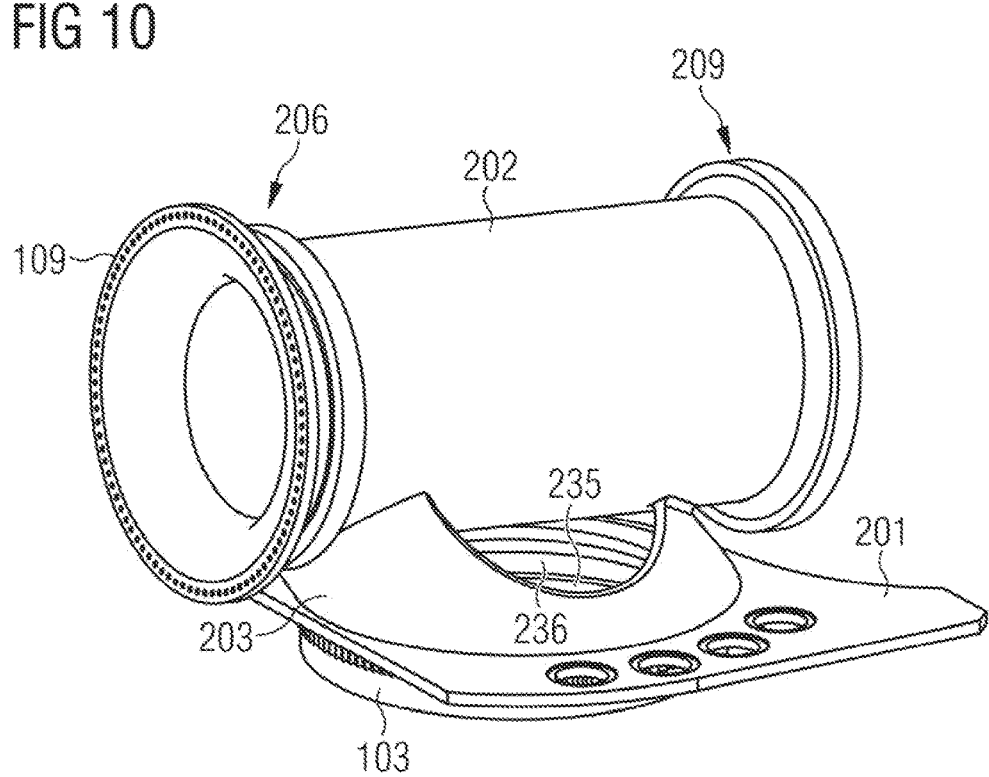
FIGS. 10 to 12 are schematic illustrations of a rotor bearing housing according to an embodiment.
Figure 11:
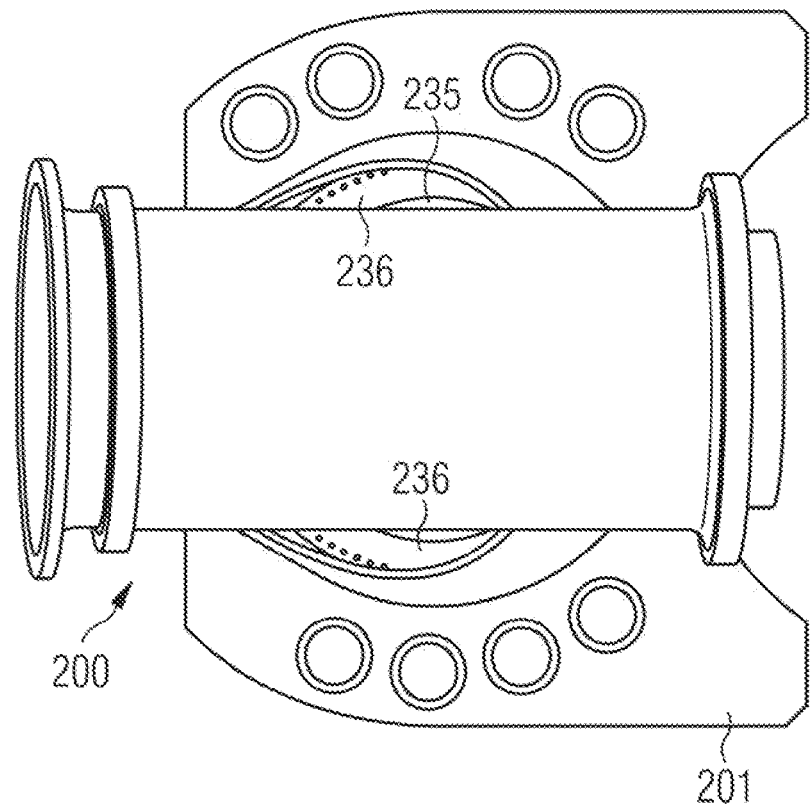
Figure 12:
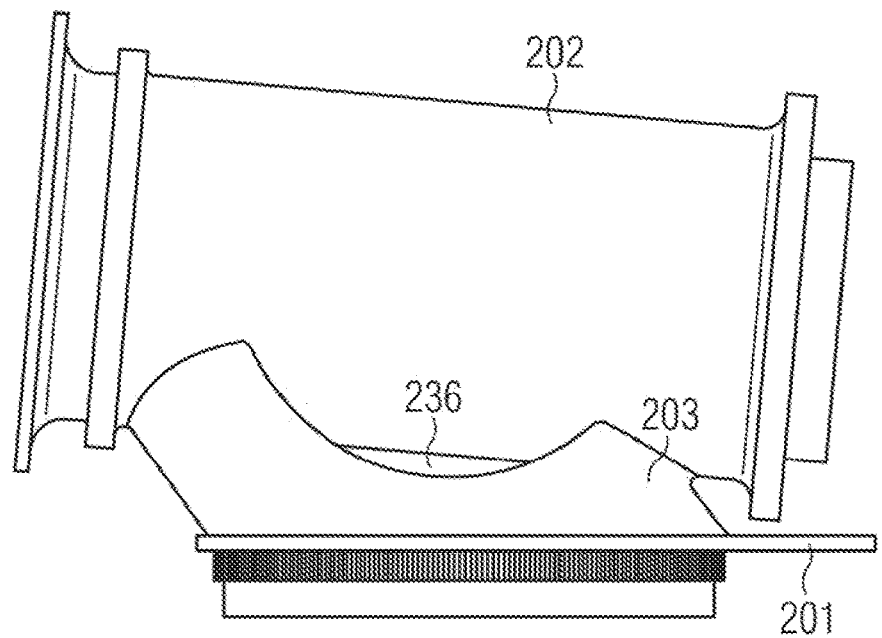

FIGS. 10 to 12 are a schematic illustration of the rotor bearing housing 200 according to a further embodiment.

A first access opening 235 is formed in the base element 201, which access opening allows access under the rotor bearing housing bearing body 200 from the direction of the tower 102. The base element 201 surrounds the first access opening 235 along the transverse direction 211.

A second access opening 236, or two further access openings 236, are formed on the support body 203. The further access opening 236 allows access into the nacelle 106 from the support body 203. The further access opening 236 is formed in particular between the bearing body 202 and the support body 203. A complete connection between the support body 203 and the base element 201 at the first end 216 of the support body 203, which is in particular not interrupted by an access opening, is thus made possible. This allows a reliable transmission of the forces between the support body 203 and the base element 201.

Figure 13:
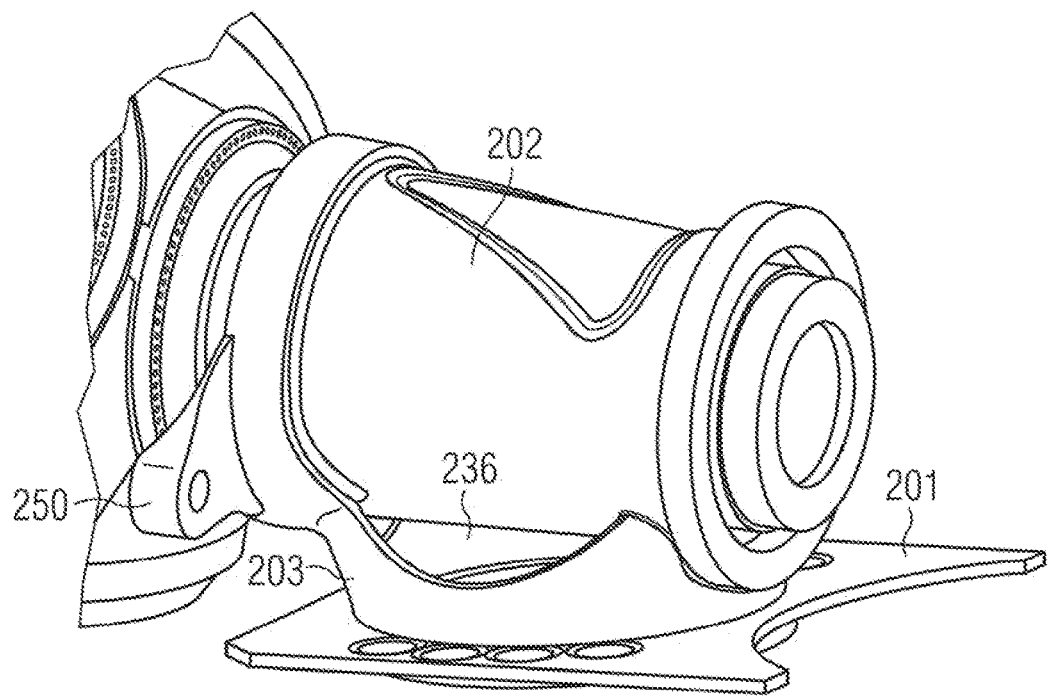
FIGS. 13 and 14 are schematic illustrations of a rotor bearing housing according to an embodiment; and, FIGS. 15 and 16 are schematic illustrations of a rotor bearing housing according to an embodiment.
Figure 14:
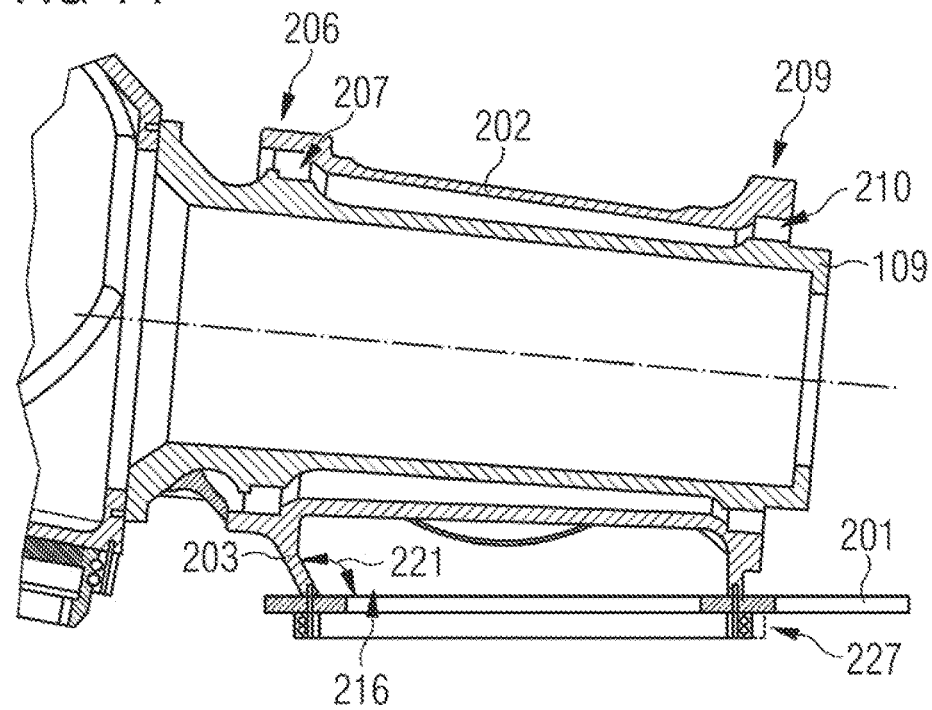

FIGS. 13 and 14 show the rotor bearing housing 200 according to a further embodiment. By contrast to the rotor bearing housing 200 as per FIGS. 9 and 10, for example, the first receptacle 206 and the second receptacle 209 of the bearing body 202 are configured to be wider. The first receptacle 206 and the second receptacle 209 are in particular directly supported by the support body 203. In particular, the bearing body 202 is supported by the support body 203 partially or entirely via the first receptacle 206 and the second receptacle 209. The support body 203 is in particular situated, along the longitudinal direction 212, in each case directly under the first and second receptacles 206, 209. It is thus possible to increase the stiffness of the supporting structure around the respective rotor bearings 207, 210. This allows a more favorable load distribution of the rolling bodies on the raceway thereof.

The vertical projection of the geometrical central point 238 of the first rotor bearing 207 or of the first receptacle 206 is situated outside the tower diameter 230. For example, the spacing between the geometrical central point 238 and the tower diameter 230 is smaller than in the embodiment of FIGS. 9 and 10. For example, a minimum spacing between the geometrical central point 238 and the tower diameter 230 is in a range between 2 cm and 50 cm. For example, the first angle 221 is smaller than in the embodiment of FIGS. 9 and 10. It is thus possible for that region of the support body 203 which is situated under the first receptacle 206 to be formed with a greater stiffness, which leads to a more expedient load distribution of the rolling bodies on the raceway in the first rotor bearing 207.

The selection of the spacing between the geometrical central point 238 of the first rotor bearing 207 and the tower wall is thus in particular specified in a manner dependent on the beneficial force flow, the sufficient spacing between the rotor blades 110 and the tower 102, and the desired stiffness.

The seat of the support body 203 on the base element 201 lies for example directly over a ring of the yaw bearing 227, for example either the inner ring or the outer ring. The second end 217 of the support body 203 lies for example directly over a ring of the yaw bearing 227, for example either the inner ring or the outer ring. For example, the second end 217 of the support body 203 lies directly over the rotatable ring of the yaw bearing 227. A good force flow of the loads from the rotor bearing housing 200 into the tower 102 is thus possible.

Figure 15:
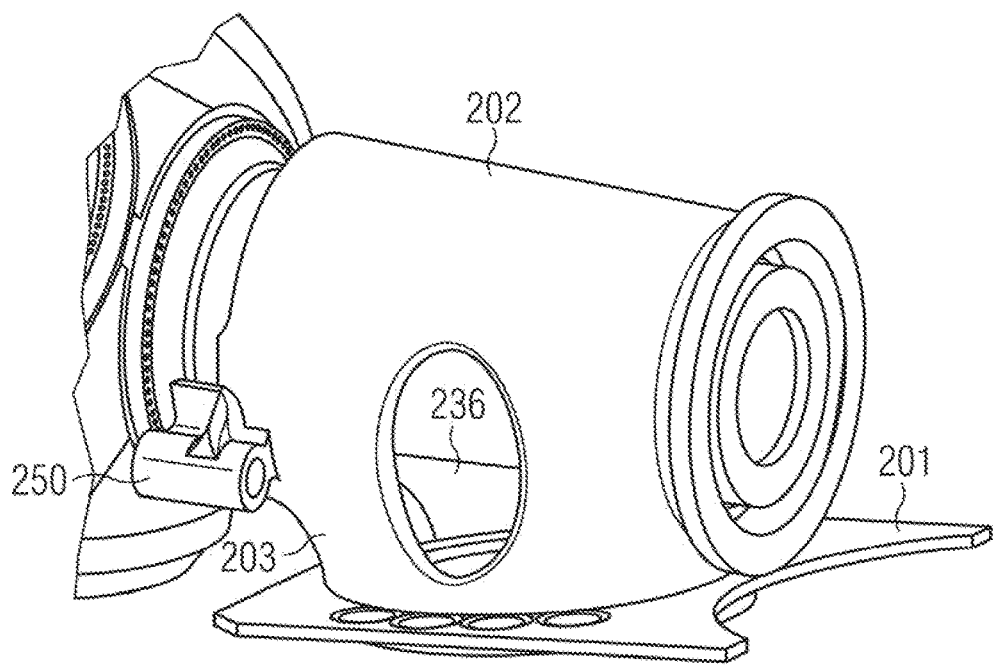
Figure 16:
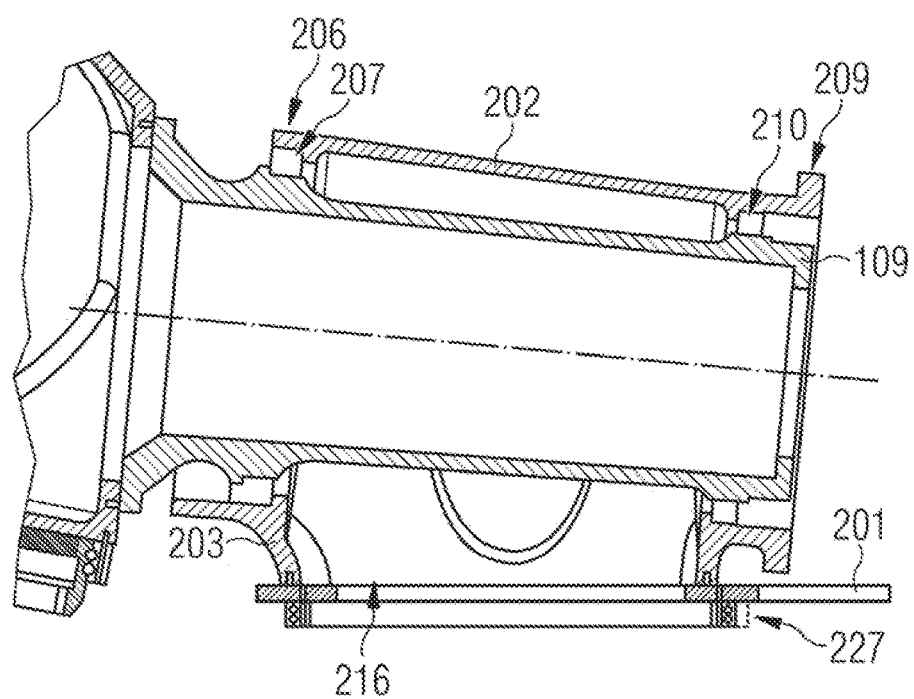

FIGS. 15 and 16 show the rotor bearing housing 200 according to a further embodiment. By contrast to the rotor bearing housing 200 as per FIGS. 9 and 10 or the rotor bearing housing 200 as per FIGS. 13 and 14, for example, the rotor bearing housing 200 does not have a closed cylindrical or frustoconical bearing body 202. Instead, the bearing body 202 is open at least in certain regions, in particular at its underside. For example, the bearing body 202 has substantially a semicylindrical shape. The bearing body 202 and the support body 203 transition into one another and merge in a flowing manner. The access opening 235, 236 can thus be made large. It is thus made easier for maintenance personnel to enter the nacelle 106. It is thus possible, for example, for health and safety guidelines to be reliably complied with. The open bearing body 202 allows easy access to the rotor bearings 207, 210, for example for maintenance work such as an exchange of seals.

The rotor bearing housing 200 in the various embodiments allows good dimensional stability owing to an expedient stiffness distribution. In particular, it is possible for the various features that have been discussed with regard to the different figures to be combined with one another across figures. The different inclinations and angles of the connecting wall 219 are for example combinable with the varying or constant wall thickness 220.

The rotor bearing housing allows closed structures, such as the closed bearing body 202 (for example FIGS. 2 to 14), which circumferentially completely surrounds the rotor shaft 109. Alternatively, the rotor bearing housing allows open structures, such as the open bearing body 202 (for example FIGS. 15 and 16), which circumferentially only partially surrounds the rotor shaft 109.

Owing to the relatively large spacings 224 and 229, it is possible to realize large support widths for the transmission of the forces and moments from the bearing body 202 into the tower 102. The rotor bearings 207, 210 may be pre-installed in the rotor bearing housing 200 already before being installed on the tower 102. The rotor bearing housing 200 allows an inclined bearing arrangement which has sufficient stiffness in an axial direction to brace the rotor bearings 207, 210. The rotor bearings 207, 210, which are for example tapered-roller bearings, are supported with sufficient stability along the transverse direction 211 in the bearing body 202.

The bearing body 202 has, for example, a different diameter at the first receptacle 206 and at the second receptacle 209 than between the two receptacles 206, 209. The diameter of the bearing body 202 need not be constant, but may vary, along the axial direction 213.

The combination of the hollow cylindrical or hollow frustoconical bearing body 202 and of the support body 203 that is elliptical in cross section 218 allows a high radial and axial stiffness of the rotor bearing housing 200 as a whole. This also allows stabilization and support of the yaw bearing in the yaw system. The bearing body 202 is for example provided primarily for axial stiffening, and the support body 203 is provided primarily for radial stiffening. The contour of the connecting wall 219 arises from the connection between the elliptical outline at the cross section 218 of the support body 203 and the circular ring at the first end 216 of the support body 203. Different contours of the connecting wall 219 and of the support body 203 arise in a manner dependent on the offset and form of the elliptical outline.

The rotor bearing housing 200 in the various embodiments allows a reliable force flow 214 from the rotor bearings 207, 210 through the bearing body 202 and the support body 203 into the base element 201. The force flow is then transmitted from the base element through the yaw system into the tower 102. Owing to the protruding arrangement of the first receptacle 206 and of the first rotor bearing 207, reliable support of the rotor shaft 109 is realized.

It is understood that the foregoing description is that of the preferred embodiments of the invention and that various changes and modifications may be made thereto without departing from the spirit and scope of the invention as defined in the appended claims.

REFERENCE DESIGNATIONS 100 wind turbine
101 incident wind flow
102 tower
103 first end of the tower
104 foundation
105 second end of the tower
106 nacelle
108 rotor
109 rotor shaft
110 rotor blade 112 rotor hub
200 rotor bearing housing
201 base element
202 bearing body
203 support body
204 main extent plane
205 first end of the bearing body
206 first receptacle
207 first rotor bearing
208 second end of the bearing body
209 second receptacle
210 second rotor bearing
211 transverse direction
212 longitudinal direction
213 axis of rotation, axial direction
214 force flow
215 body
216 first end of the support body
217 second end of the support body
218 cross section
219 connecting wall
220 wall thickness
221 first angle
222 second angle
223 first direction
224 spacing between the receptacles
226, 231 spacing between receptacle and cross-sectional plane
227 yaw bearing
228 cross-sectional plane of the tower
229 spacing between the bearings
230 diameter of the tower at the first end
232, 233 central point
235, 236 access opening
237 protruding region in relation to the base element
238 geometrical central point of the first receptacle
239 geometrical central point of the second receptacle
240 geometrical central point of the first bearing
241 geometrical central point of the second bearing
242 protruding region in relation to the first end of the tower
250 rotor arresting device

What is claimed is:

1. A rotor bearing housing for a wind turbine having a tower, the rotor bearing housing comprising:
a bearing body configured to receive a rotor shaft of the wind turbine, wherein the rotor shaft rotates about a rotational axis;
said bearing body having a first bearing body end and a second bearing body end disposed opposite to said first bearing body end along an axial direction;
said bearing body having a first receptacle for a first rotor bearing at said first bearing body end and having a second receptacle for a second rotor bearing at said second bearing body end;
said bearing body extending longitudinally along the axial direction;
a support body having a first support body end;
said support body being arranged under said bearing body and being configured to be coupled to a base element at said first support body end in order to transmit a force flow between said bearing body and the base element, wherein the base element is arrangeable under the support body for rotatable fastening to a first tower end of the tower of the wind turbine;
said bearing body and said support body conjointly forming a single-piece body;
said bearing body and said support body being configured such that, if a geometrical central point of said first receptacle is projected onto a cross-sectional plane of the first tower end of the tower, the geometrical central point is arranged outside a diameter of the tower at the first tower end;
said bearing body extending in a manner of a hollow cylinder or a hollow frustum along the axial direction; and,
wherein the geometrical central point of said first receptacle is a first geometrical central point; said second receptacle has a second geometrical central point; the first geometrical central point of said first receptacle and the second geometrical central point of the second receptacle define a spacing to one another along a transverse direction; and, the spacing is at least as great as the diameter of the tower at the first tower end.

2. The rotor bearing housing of claim 1, wherein said support body has a circular symmetrical shape at said first support body end configured to be connected to the base element; and, said support body has an elliptical outline in cross sections above said first support body end and parallel to the base element.

3. The rotor bearing housing of claim 2, wherein said support body has a second support body end facing said bearing body; said support body further has a connecting wall extending between said first support body end and said second support body end; the base element defines a main extent plane; said connecting wall has, on a side of said first receptacle, a first angle with respect to the main extent plane of the base element and has, on a side of said second receptacle, a second angle with respect to the main extent plane, said first angle and said second angle being different.

4. The rotor bearing housing of claim 1, wherein said support body is, at said first receptacle, oriented so as to be inclined in a first direction between said first support body end and said bearing body; and, said support body is, at said second receptacle, oriented so as to be inclined in the first direction.

5. The rotor bearing housing of claim 1, wherein the first geometrical central point of said first receptacle has a greater spacing to the cross-sectional plane of the first tower end than the second geometrical central point of said second receptacle has to the cross-sectional plane.

6. The rotor bearing housing of claim 1, wherein the projection of the first geometrical central point of said first receptacle and a projection of the second geometrical central point of said second receptacle onto the cross-sectional plane are each arranged outside the diameter of the tower at the first tower end.

7. The rotor bearing housing of claim 1, wherein said support body has an access opening arranged between said bearing body and said support body.

8. The rotor bearing housing of claim 1, wherein said first receptacle and said second receptacle are directly supported by said support body; and, said bearing body is supported by said support body partially or entirely via said first receptacle and said second receptacle.

9. The rotor bearing housing of claim 1, wherein said bearing body is open at least in regions; and, said bearing body and said support body transition into one another and merge in a flowing manner.

10. The rotor bearing housing of claim 9, wherein said bearing body defines an underside and said bearing body is open at said underside.

11. The rotor bearing housing of claim 1, wherein:
said rotor shaft is configured to extend through said bearing body;
said first receptacle faces toward a rotor of the wind turbine; and,
said second receptacle faces away from the rotor.

12. The rotor bearing housing of claim 1, wherein said bearing body surrounds the rotor shaft.

13. The rotor bearing housing of claim 1, wherein the wind turbine includes the base element, the base element being assigned to a yaw system that is provided for the rotatable fastening of the rotor bearing housing to the first tower end.

14. The rotor bearing housing of claim 1 further comprising:
a first rotor bearing arranged in said first receptacle and a second rotor bearing arranged in said second receptacle for a mounting of the rotor shaft; and,
said first rotor bearing and said second rotor bearing each being rolling bearings.

15. The rotor bearing housing of claim 14, wherein said rolling bearings are tapered-roller bearings or angular-contact ball bearings.

* * * * *